(12) United States Patent
Alberth, Jr.

(10) Patent No.: US 10,462,409 B2
(45) Date of Patent: Oct. 29, 2019

(54) METHOD FOR COLLECTING MEDIA ASSOCIATED WITH A MOBILE DEVICE

(71) Applicant: Google Technology Holdings LLC, Mountain View, CA (US)

(72) Inventor: William P. Alberth, Jr., Prairie Grove, IL (US)

(73) Assignee: GOOGLE TECHNOLOGY HOLDINGS LLC, Mountain View, CA (US)

(*) Notice: Subject to any disclaimer, the term of this patent is extended or adjusted under 35 U.S.C. 154(b) by 594 days.

(21) Appl. No.: 14/513,067

(22) Filed: Oct. 13, 2014

(65) Prior Publication Data

US 2016/0105631 A1 Apr. 14, 2016
US 2019/0246062 A9 Aug. 8, 2019

Related U.S. Application Data

(60) Continuation of application No. 13/652,726, filed on Oct. 16, 2012, now Pat. No. 8,872,916, which is a
(Continued)

(51) Int. Cl.
*H04N 5/77* (2006.01)
*H04L 29/06* (2006.01)
(Continued)

(52) U.S. Cl.
CPC .......... *H04N 5/77* (2013.01); *G11B 27/031* (2013.01); *G11B 27/28* (2013.01);
(Continued)

(58) Field of Classification Search
CPC ...................................................... H04N 5/77
See application file for complete search history.

(56) References Cited

U.S. PATENT DOCUMENTS 6,970,183 B1  11/2005  Monroe
7,551,780 B2   6/2009  Nudd et al.
(Continued)

FOREIGN PATENT DOCUMENTS

EP   1379048 A    1/2004
WO   2001098854 A 12/2001

OTHER PUBLICATIONS

Pujianto Cemerlang et al. "Towards Automatic Mobile Blogging" IEEE Int'l Conf. on Multimedia and Expo, Jul. 1, 2006, pp. 2033-2036, XP031033265.
(Continued)

*Primary Examiner* — Jayanti K Patel
*Assistant Examiner* — Irfan Habib
(74) *Attorney, Agent, or Firm* — Morgan, Lewis & Bockius LLP (57) ABSTRACT

A media collection system (102) uses media collection devices (107) to record media in the vicinity of a mobile device (104). A method (300) for collecting media associated with a user of a mobile device (104) includes the mobile device detecting (304) a broadcast signal from a communication node of the media collection system (102) at a radio interface of the mobile device. Then the mobile device requests (308) a media collection service of the media collection system. In response, the mobile device receives (314) an access identifier from the media collection system. The access identifier can be used to access media collected by the media collection system. The mobile device can then cease a self-collection activity while in the vicinity of the media collection system.

20 Claims, 5 Drawing Sheets

Related U.S. Application Data division of application No. 11/966,478, filed on Dec. 28, 2007, now Pat. No. 8,314,838.

(51) Int. Cl.

| | | |
|---|---|---|
| *H04L 29/08* | (2006.01) | |
| *G11B 27/28* | (2006.01) | |
| *H04W 4/021* | (2018.01) | |
| *G11B 27/031* | (2006.01) | |

(52) U.S. Cl.
CPC ...... *H04L 65/1003* (2013.01); *H04L 65/4084* (2013.01); *H04L 67/18* (2013.01); *H04W 4/021* (2013.01)

(56) References Cited

U.S. PATENT DOCUMENTS

| | | | | |
|---|---|---|---|---|
| 7,606,560 | B2 | 10/2009 | Labrou et al. | |
| 7,630,986 | B1 | 12/2009 | Herz et al. | |
| 7,734,062 | B2* | 6/2010 | Kato | G06K 9/00362 |
| | | | | 382/103 |
| 7,760,908 | B2* | 7/2010 | Curtner | G06F 17/3079 |
| | | | | 348/143 |
| 7,768,548 | B2 | 8/2010 | Silvernail et al. | |
| 7,987,155 | B2 | 7/2011 | Fernandez | |
| 8,558,921 | B2* | 10/2013 | Walker | G06F 17/30265 |
| | | | | 348/231.2 |
| 8,620,772 | B2* | 12/2013 | Owen | H04N 5/235 |
| | | | | 705/26.9 |
| 8,717,436 | B2* | 5/2014 | Heminghous | H04N 21/21805 |
| | | | | 348/143 |
| 8,948,442 | B2* | 2/2015 | Breed | B60R 1/00 |
| | | | | 382/100 |
| 9,049,348 | B1* | 6/2015 | Foster | H04N 7/181 |
| 9,064,036 | B2* | 6/2015 | Hyde | G06F 19/326 |
| 9,111,143 | B2* | 8/2015 | Meredith | G06K 9/00577 |
| 9,158,974 | B1* | 10/2015 | Laska | G06T 7/246 |
| 9,170,707 | B1* | 10/2015 | Laska | G06K 9/00711 |
| 9,172,918 | B2* | 10/2015 | Palmer | H04N 7/181 |
| 9,277,174 | B2* | 3/2016 | Yamahara | H04N 5/77 |
| 9,361,011 | B1* | 6/2016 | Burns | G06F 17/30825 |
| 9,407,860 | B2* | 8/2016 | Barnes, Jr. | H04N 5/77 |
| 9,472,238 | B2* | 10/2016 | Burns | G11B 27/10 |
| 9,570,113 | B2* | 2/2017 | Campbell | H04N 9/806 |
| 9,607,652 | B2* | 3/2017 | Bose | G11B 27/031 |
| 2001/0010541 | A1 | 8/2001 | Fernandez et al. | |
| 2004/0097242 | A1 | 5/2004 | Hull et al. | |
| 2004/0190753 | A1* | 9/2004 | Sakagami | H04N 7/18 |
| | | | | 382/103 |
| 2006/0224704 | A1 | 10/2006 | Parikh et al. | |
| 2006/0262976 | A1 | 11/2006 | Hart et al. | |
| 2006/0265489 | A1 | 11/2006 | Moore et al. | |
| 2007/0035632 | A1 | 2/2007 | Silvernail et al. | |
| 2007/0050419 | A1 | 3/2007 | Weyl et al. | |
| 2007/0061487 | A1 | 3/2007 | Moore et al. | |
| 2007/0112762 | A1 | 5/2007 | Brubaker | |
| 2007/0149222 | A1 | 6/2007 | Hodko et al. | |
| 2007/0153091 | A1* | 7/2007 | Watlington | H04N 7/15 |
| | | | | 348/208.14 |
| 2007/0199076 | A1 | 8/2007 | Rensin et al. | |
| 2007/0200917 | A1 | 8/2007 | Chen et al. | |
| 2007/0277205 | A1 | 11/2007 | Grannan | |
| 2008/0222711 | A1 | 9/2008 | Michaelis | |
| 2009/0094649 | A1* | 4/2009 | Patel | G08B 13/19641 |
| | | | | 725/86 |
| 2009/0254971 | A1 | 10/2009 | Herz et al. | |
| 2009/0315972 | A1 | 12/2009 | Rensin et al. | |
| 2010/0030734 | A1 | 2/2010 | Chunilal | |
| 2010/0166309 | A1 | 7/2010 | Hull et al. | |
| 2010/0235285 | A1 | 9/2010 | Hoffberg | |
| 2011/0004513 | A1 | 1/2011 | Hoffberg | |
| 2011/0016006 | A1 | 1/2011 | Opdycke | |
| 2011/0047566 | A1* | 2/2011 | Matuchniak | H04N 7/162 |
| | | | | 725/29 |
| 2011/0081892 | A1 | 4/2011 | Graham et al. | |
| 2014/0340467 | A1* | 11/2014 | Kajarekar | G06K 9/00288 |
| | | | | 348/14.08 |
| 2015/0326902 | A1* | 11/2015 | Levakov | H04N 21/21805 |
| | | | | 725/59 |

OTHER PUBLICATIONS

United States Patent and Trademark Office, "Non-Final Rejection" for U.S. Appl. No. 11/966,478, dated Dec. 23, 2011, 12 pages.
United States Patent and Trademark Office, "Notice of Allowance" for U.S. Appl. No. 11/966,478, dated Jul. 19, 2012, 31 pages.
Patent Cooperation Treaty, "Notifcation of Transmittal of the International Search Report and the Written Opinion of the International Searching Authority" for Int'l Application No. PCT/US2008/087116, dated Apr. 23, 2009, 15 pages.
Motorola, Inc., International Preliminary Report on Patentability/Written Opinion of the International Search Authority, PCT/US2008/087116, dated Jun. 2010, 6 pgs.

* cited by examiner

METHOD FOR COLLECTING MEDIA ASSOCIATED WITH A MOBILE DEVICE

CROSS REFERENCE TO RELATED APPLICATIONS

This application is a continuation of and claims priority to U.S. patent application Ser. No. 13/652,726 entitled "Method for Collecting Media Associated with a Mobile Device," filed Oct. 16, 2012, now U.S. Pat. No. 8,872,916, issued on Oct. 28, 2014, which is a divisional of U.S. patent application Ser. No. 11/966,478, entitled "System and Method for Collecting Media Associated with a Mobile Device," filed Dec. 28, 2007, now U.S. Pat. No. 8,314,838, issued on Nov. 20, 2012, each of which is herein incorporated by reference in its entirety.

TECHNICAL FIELD

This disclosure relates in general to media collection systems and methods, and more particularly to the collection of media relating to a person's experiences while in a vicinity of a media collection system.

BACKGROUND

People come into contact with media collection systems in various settings, the most common of which may be so called security cameras in business establishments and in public venues. These systems include sensors to collect pictographic and sometimes audiographic information to record experiences and happenings in the vicinity of the media collection system. Typically the media collected by these systems are for the benefit of an owner or operator of the system. For example, video information may be recorded in a retail facility to help law enforcement authorities solve any crimes that may be committed on the premises. In fact, some law enforcement agencies use facial recognition to identify persons in public venues who may be of interest to the agency. The information collected is not typically shared with others, except, for example in situations where help is sought from the public in identifying persons whose image has been captured in the collected media. The information is not shared directly with the people who appear in the collected media.

Presently, some researchers are conducting experiments which involve the "digitization" of a person's experiences. Sensors and other media collection devices are worn or carried by the person, and various data, images, video, and sounds may be recorded to form a record of the person's experiences, actions, interactions, as well as ambient conditions such as temperature, atmospheric pressure, and relative humidity. The amount of information collected may be quite substantial, and require somewhat bulky equipment to be worn or carried by a user, including the means to power the collection equipment. The collection of such information may be beneficial in many ways, such as, for example, helping a person to remember where they may have left an object, identifying people with whom the person interacted, the time of onset or changes of physiological conditions, and so on. People have generally avoided collecting a comprehensive media record of their experiences in part due to the limitations associated with the equipment necessary to do so. Instead, people generally choose to record only very significant experiences by use of hand held still image and video cameras, if at all.

Given that people often come into the purview of media collection systems, it would therefore be beneficial to allow people access to collected or recorded media in which they may appear. Furthermore, such media collection may be enhanced to a degree that people are willing to pay a reasonable fee to have their experiences recorded for them in certain situations.

DETAILED DESCRIPTION

While the specification concludes with claims defining the features of the disclosure that are regarded as novel, it is believed that the disclosure will be better understood from a consideration of the following description in conjunction with the drawing figures, in which like reference numerals are carried forward.

Figure 1:
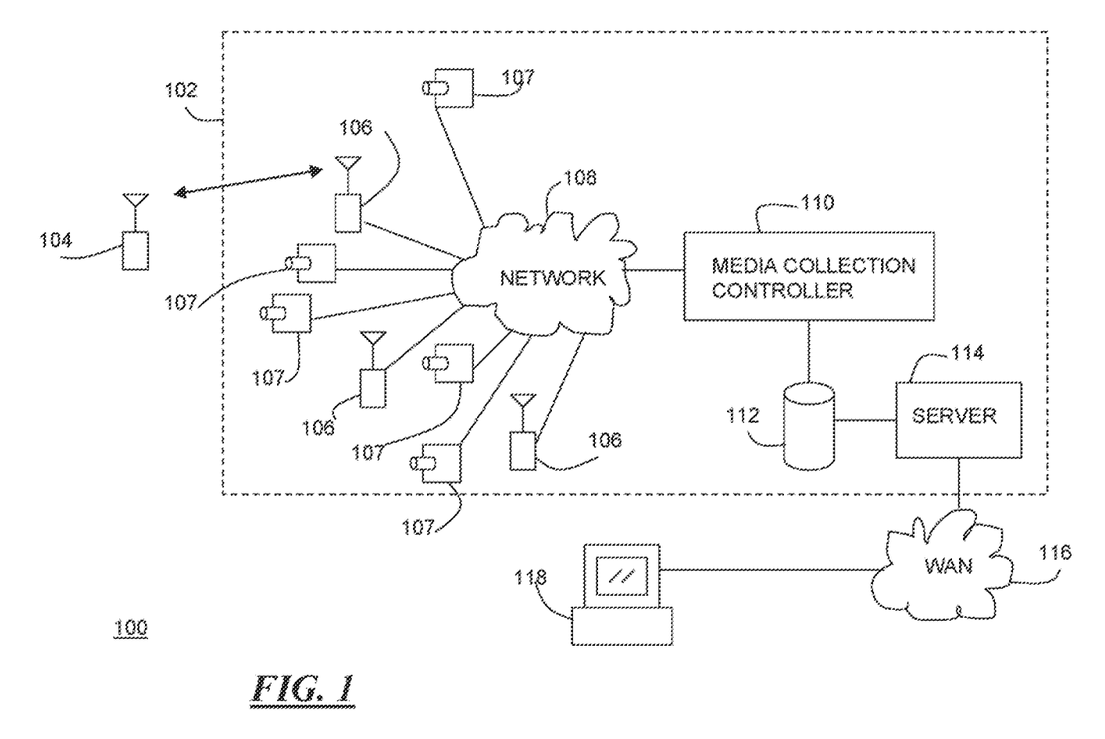
FIG. 1 shows a block schematic diagram of a media collection system, in accordance with an embodiment.

Referring now to FIG. 1, there is shown a block schematic diagram 100 of a media collection system 102, in accordance with an embodiment. The media collection system 102 works in conjunction with a mobile device 104 via a one or more wireless communication nodes 106. The communication nodes 106 allow wireless communication between appropriately equipped mobile devices and the media collection system. They are relatively low power, and may be designed to provide an air interface such as those provided by the Institute for Electrical and Electronic Engineers (IEEE) specifications 802.15.1 and 802.11. IEEE 802.15.1 is known more commonly by the trade name Bluetooth, while IEEE 802.11 is known as wireless local area network (WLAN), or wireless fidelity (WiFi). Numerous other air interfaces may exist or be created which will operate to allow communication between the communication nodes and mobile devices. The communication nodes are located in places where a user of the mobile device will pass by within radio range of the communication node. It is preferred to use a low power interface, such as those of WiFi or Bluetooth because their low power provides better granularity in determining the location of mobile in the network of communication nodes. It is contemplated, however, that the communication nodes may be operated on a wide area network, such as cellular telephony networks. Similarly, the media collection system includes a plurality of media collection devices 107, such as cameras and microphones. The media collection devices and communication nodes are connected via network 108 to a media collection controller 110. The media collection controller 110 includes computer and data processing elements as well as memory and instruction code as appropriate, in accordance with the teachings herein. The media collection controller is further coupled to a database 112 or other mass storage media. The collected and digitized media is stored on the database. A server 114 allows access to the stored media via a data network 116 which may include public wide area data networks, such as the internet. A user of the mobile device 104 may interface with the server 114 by using a computer 118 or other suitable equipment.

The communication nodes 106 and media collection devices are placed in locations where users may desire to have their experiences recorded. For example, the media collection system may be used to record the experiences of people in an amusement or theme park, retail and shopping facilities, sporting event venues, and so on. The communication nodes may be co-located with the media collection devices, or they may be placed in different places. Furthermore, there is no necessary correspondence between the number of communication nodes and the number of media collection devices used in the system. There may be several media collection devices in the vicinity of a given communication node, positioned at different angles, for example.

The media collection devices operate under control of the media collection controller, and send collected media to the controller for processing and storage in the database 112. The media collection device may collect media in a variety of formats, including still images, video clips, streaming video, and audio. The media collection devices may provide captured media to the media collection controller, or they may provide streamed media to the media collection controller which then harvests appropriate media from the streamed content. For example, the media collection device may be a video camera providing a live video feed to the media collection controller, and the media collection controller produces video clips or still images from the video feed.

In operation, the mobile device may be moved throughout the region covered by the network of communication nodes and media collection devices. As the mobile device moves, it comes into radio contact with different communication nodes, giving a general location of the mobile device. The mobile device may use, for example, a unique identifier so that it may be identified. As the mobile device moves from associating with one communication node to associating with the next communication node, such association changes are reported to the media collection controller 110. The media collection controller 110 maintains information as to which media collection devices 107 are in the vicinity of the communication node with which the mobile device is presently associated. The media collection controller may then collect media from those media collection devices in the vicinity of the mobile device.

Figure 2:
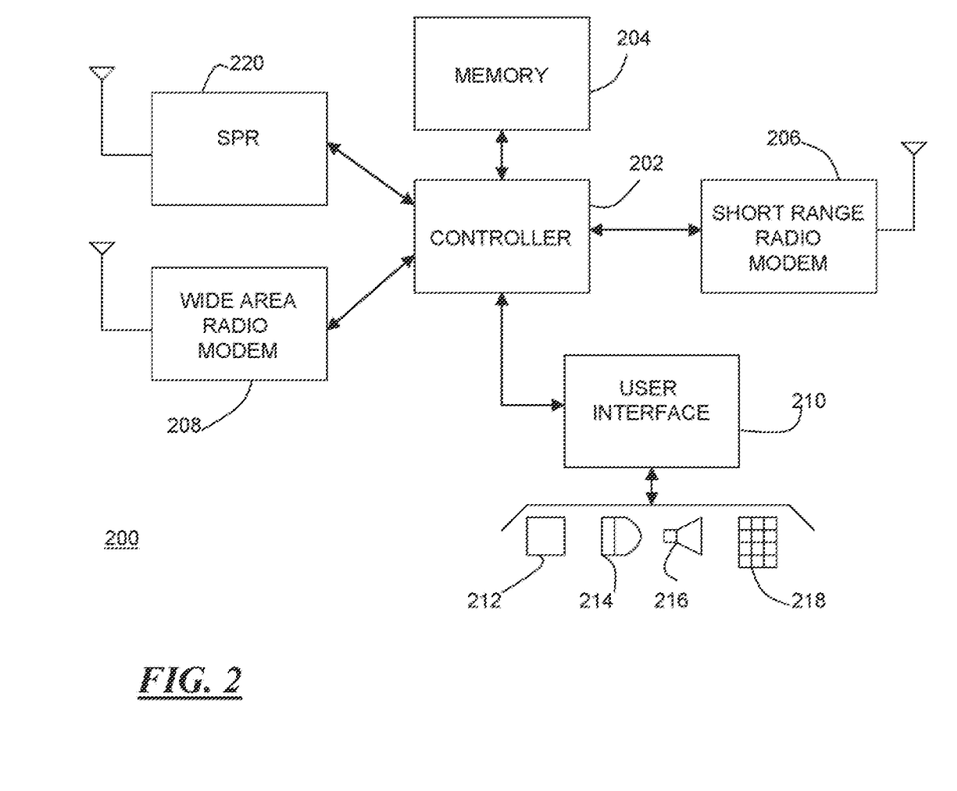
FIG. 2 shows a block schematic diagram of mobile device for use with a media collection system, in accordance with an embodiment.

Referring now to FIG. 2, there is shown a block schematic diagram of a mobile device 200, in accordance with an embodiment. Central to the operation of the mobile device 200 is a controller 202 which operates in accordance with instruction code stored in a memory 204. The instruction code causes the mobile device to operate in accordance with the teachings herein, and may facilitate additional operation and functions not discussed here. The mobile device includes a short range radio modem 206 which allows the mobile device to communicate with the communication nodes 106, and possible other devices if designed to operate according to any of the existing air interface standards. As mentioned the short range modem may be designed to operate according to IEEE specifications 802.15.1 or 802.11, as is known. Other specifications may be used equivalently. The mobile device uses the short range radio modem to both detect the presence of a communication node, as well as communicate with the media collection system via the communication nodes. The mobile device may be, for example, a cellular telephone, and include a wide area radio modem 208 for communicating with cellular networks. The mobile device may further comprise a user interface 210, which includes control and interface elements to allow a user to interact with the mobile device, control its operation, and input to and receive information from the mobile device. For example, there may be provided a graphical display 212, a microphone 214, speaker 216, and keypad and other buttons 218. Furthermore it is contemplated that the mobile device may comprise a satellite positioning receiver 220, such as a global positioning satellite receiver, which allows the mobile device to determine its location. The location information may be reported over either the short range of the wide area radio modems, or both. In particular, the location information may be reported or provided to the media collection system to allow the media collection system to decide which media collection devices 107 are most appropriate to use for collecting media that will include the user of the mobile device. It is further contemplated that the mobile device may provide other information to the media collection system to facilitate the collection of media that includes the user of the mobile device. For example, an image of the user may be provided to the media collection system so that facial recognition may be used by the media collection system to identify the user via the media collection devices.

Figure 3:
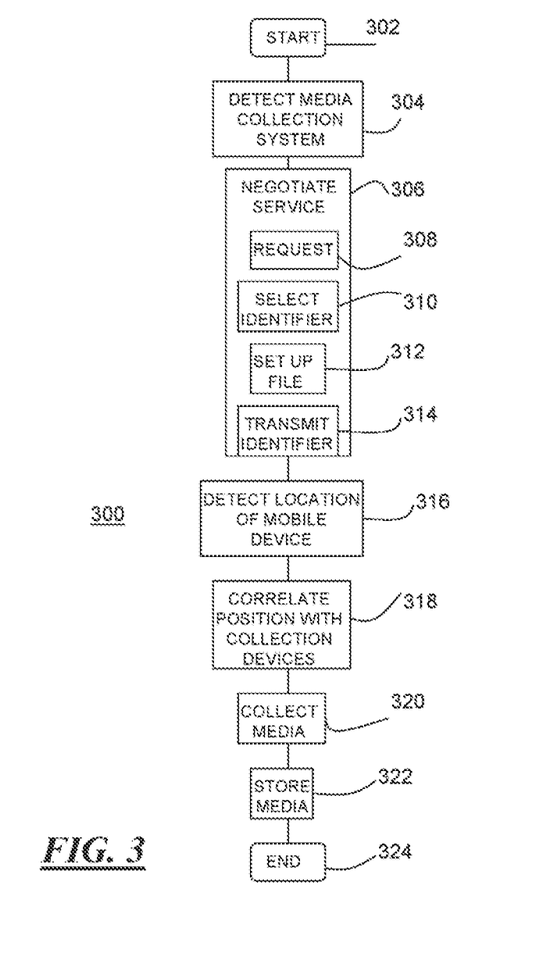
FIG. 3 shows a flow chart diagram of a method of collecting media, in accordance with an embodiment.

Referring now to FIG. 3 there is shown a flowchart diagram 300 of a method for collecting media, in accordance with an embodiment. At the start 302, the mobile device is powered on and performing its normal operations. The user of the mobile device brings it within a region covered by a media collection system. The mobile device then detects the presence of the media collection system 304. The detection of the media collection system may occur automatically, or it may be prompted by the user by searching for the media collection system via the user interface 210. Upon detection of the media collection system, the mobile device commences negotiating for media collection service 306. The negotiation may include a request for service 308. In response to receiving the request, the media collection system selects an access identifier 310 to be used in association with collected media associated with the mobile device. The media collection system may set up a storage file or account directory 312 on the database 112. Media collected in association with the mobile device will be then stored in the directory. The media collection system will also transmit the access identifier to the mobile device 314. The access identifier may be used by the user of the mobile device to access the collected media stored in the database and associated with the user's account or directory. The access identifier may take the form of a unique internet uniform resource locator (URL) which may be received and interpreted by the server 114 to access the collected media associated with the mobile device.

Once the negotiation is finished and the account or directory is set up the media collection system may then commence collecting media associated with the mobile device. Generally, the media collection system detects or determines the location of the mobile device 316. The location may be in the form of geographic location coordinates, or it may simply be a mapping of the mobile device to the nearest media collection devices 107 or communication node 106. In one embodiment, for example, the media collection system may receive positioning coordinates from the mobile device if the mobile device has a satellite positioning receiver and can receive satellite positioning signals. Alternatively, the media collection system may use radio triangulation among communication nodes closest to the mobile device as determined, for example, by received radio signal strength. In another embodiment it is contemplated that facial recognition of the user of the mobile device may be used for location purposes. Facial recognition may be facilitated by providing an image or facial recognition parameters corresponding to the user or persons associated with the user to the media collection system. The media collection system may then compare live video feeds against the received information and save media or flag feeds that match the information. Alternatively, the comparison may be performed on stored media to determine the presence of the user or persons associated with user in the collected media.

Furthermore, it is contemplated that the mobile device may be a media collection device which performs self-collection activity. Once the media collection system has commenced media collection service, the mobile device may then cease the self-collection activity, for example, upon receiving the access identifier 314. By ceasing the self-collection activity, the mobile device will reduce energy consumption, conserving battery charge, and storage space on the device.

Furthermore, it is contemplated that the mobile device may be a media collection device which performs self-collection activity. Once the media collection system has commenced media collection service, the mobile device may then cease the self-collection activity, for example, upon receiving the access identifier 314. By ceasing the self-collection activity, the mobile device will reduce energy consumption, conserving battery charge, and storage space on the device.

The detection, correlation, collection, and storage steps may be repeated as needed. When the collection service is no longer necessary or needed, the method ends 324, leaving the collected media accessible to the user by use of the access identifier. The service may no longer be needed if, for example, the mobile device moves outside of the region serviced by the media collection system, or if the user decides to have the collecting ended. The collection system may confirm the cessation of collection activity by notification, at which time the mobile device may resume or commence a self-collection activity. It is contemplated that, while collecting the media, the system may time stamp or location stamp, or both, the collected media. That is, the time/location are recorded with the media. Furthermore, when the media is collected, the system may inform the mobile device of the collection activity, including the time information so that the user may track system activity.

Figure 4:
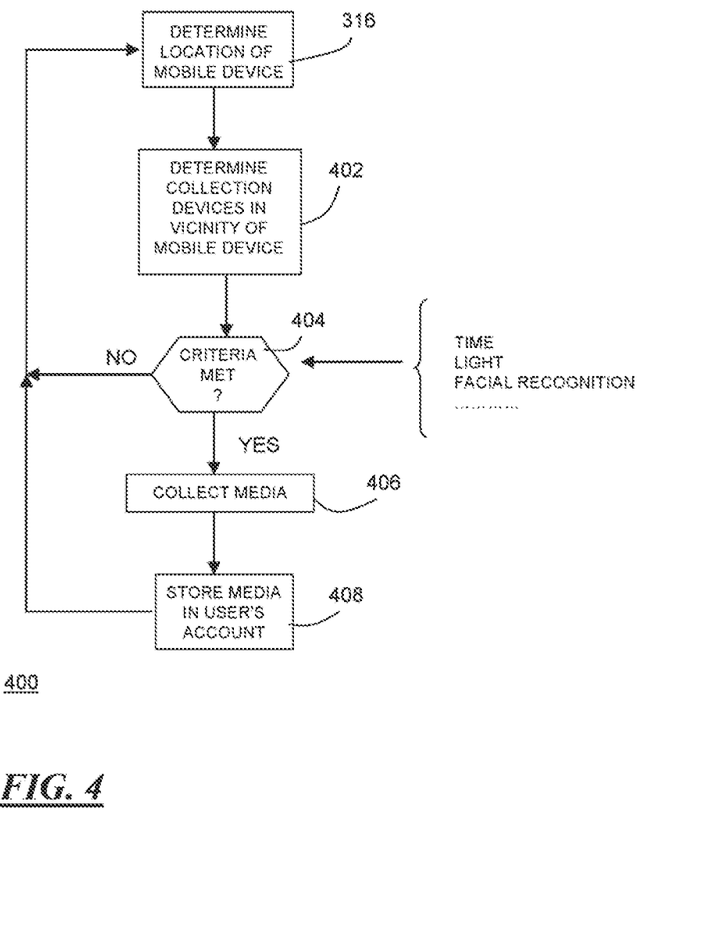
FIG. 4 shows a flow chart diagram of a method of collecting media, in accordance with an embodiment.

Referring now to FIG. 4, there is shown a flow chart diagram 400 of a method collecting media in accordance with an embodiment. The method illustrated is a more detailed example of steps 316-322 of FIG. 3. Upon determining the location of the mobile device 316, the system may determine the location of media collection devices in the vicinity of the mobile device 402. There are a number of different ways this may be performed. For example, the system may map specific collection devices to a given communication node. When the mobile device associates with the communication node, for radio communication, one or more collection devices associated with the communication node may be used to collect media. Alternatively, the system may make a finer location determination by use of location information received from the mobile device, or radio triangulation. Once the location of the mobile device and appropriate collection devices are determined, the system controller 110 may determine if a collection criteria is met 404. The collection criteria may include, for example, time since the last collection event, lighting conditions, facial recognition of the user, and so on. If the criteria isn't met, the method repeats, and may have to track the mobile device to other locations. If the collection criteria is met, the system commences collecting the appropriate media 406. In the initial negotiation for service the particular type of media to be collected may be established. The mobile device may request only still images be collected, or that video in addition to still images may be collected. Furthermore, the frequency of collection events may be established in the initial request negotiation. Each time media is collected, it is then stored 408 in the appropriate file, directory, or data structure where it may be later accessed and served to the user. Some collection systems, such as security systems, may simply flag certain recording as being of interest to, or associated with the user's access identifier so that subsequently the user, upon providing the access identifier, may be provided the specific recordings identified as being of interest.

Figure 5:
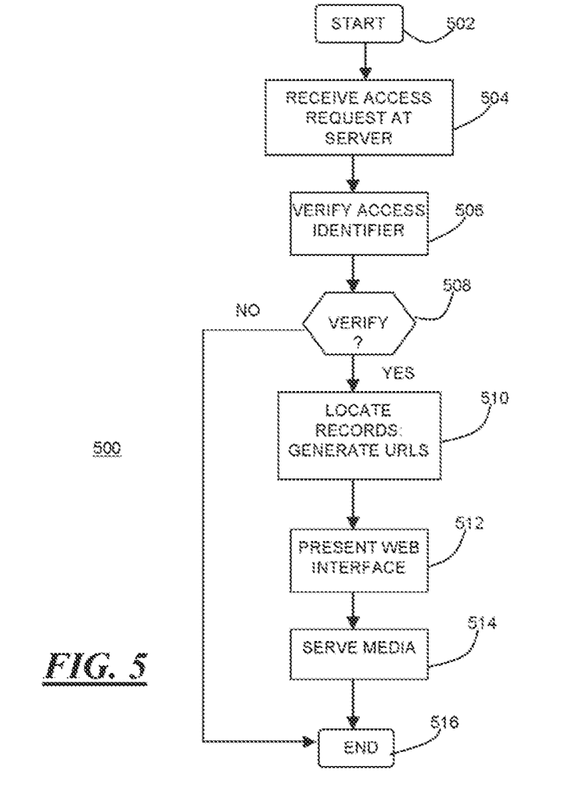
FIG. 5 shows a flow chart diagram of a method of collecting media, in accordance with an embodiment.

Referring now to FIG. 5, there is shown a flow chart diagram 500 of a method of accessing collected media in accordance with an embodiment. At the start 502, the media is stored on the database 112 of the media collection system, and is accessible by the server 114. The server receives a request 504 to access specific media stored on the database. The request includes the access identifier, which is verified by the server 506, 508. If the access identifier doesn't verify, the method terminates 516. The server may request resubmission of the access identifier and repeat the process. If the access identifier is verified, according to one embodiment, the server locates the media 510, and presents an interface 512 to the user. The interface allows the user to, for example, preview the collected media, and transfer selected files to the user's computer over the data network or internet 514.

It is further contemplated that the media collection system may simply constantly record media, and, upon being accessed by a user, search the recorded media for media that includes or relates to the user. Facial recognition may be one way to identify media including the user, for example. Additionally, a log of the user's location over time may be provided to the media collection system to help the media collection system locate relevant media.

While the preferred embodiments have been illustrated and described, it will be clear that the invention is not so limited. Numerous modifications, changes, variations, substitutions and equivalents will occur to those skilled in the art without departing from the spirit and scope of the present invention as defined by the appended claims.

The invention claimed is:

1. A method performed at a computing system, comprising:
    receiving, without user interaction, video data and audio data captured via a plurality of distributed video devices configured to monitor one or more vicinities;
    receiving a first request from a mobile device for a media collection service;
    in response to the first request, determining, without user interaction, a user of a mobile device to be within a proximity of the plurality of distributed video devices;
    in accordance with a determination that the user is within the proximity of the plurality of distributed video devices:
        identifying, without user interaction, video data and audio data in which the user of the mobile device appears; and
        storing the identified video data and the audio data to the computing system;

receiving a second request from the user of the mobile device to access the identified video data and the audio data; and in response to the second request, transmitting the identified video data and the audio data to the user.

2. The method of claim 1, wherein determining a user of a mobile device to be within a proximity of the plurality of distributed video devices is based at least in part on content of the video data.

3. The method of claim 2, wherein determining a user of a mobile device to be within a proximity of the plurality of distributed video devices is further based on one or more facial recognition analyses of the video data.

4. The method of claim 1, wherein storing the identified video data and the audio data comprises storing a timestamp along with the identified video data and the audio data.

5. The method of claim 1, wherein storing the identified video data and the audio data comprises storing a location stamp along with the identified video data and the audio data.

6. The method of claim 1, wherein receiving the second request comprises receiving the second request via the computing system from an external electronic device to access the identified video data and the audio data.

7. The method of claim 1, further comprising transmitting the identified video data and the audio data to an external electronic device.

8. The method of claim 7, further comprising transmitting the identified video data and the audio data to the external electronic device based on whether an access identifier is received from the external electronic device.

9. The method of claim 1, further comprising parsing the video data and audio data for video data and audio data that includes a subject of interest or for video data and audio data that is at least partially associated with the subject of interest.

10. The method of claim 9, further comprising performing one or more facial recognition analyses to identify the subject of interest or one or more associations of the subject of interest.

11. The method of claim 1, wherein storing the identified video data and the audio data comprises associating the identified video data and the audio data with a user account.

12. The method of claim 1, wherein receiving the video data and the audio data comprises receiving the video data and the audio data from the plurality of distributed video devices over a wireless local area network (WLAN).

13. The method of claim 1, wherein receiving the video data and the audio data comprises receiving the video data and the audio data from the plurality of distributed video devices over a short range wireless communications network.

14. A system for collecting and displaying media, comprising:

a media recording device configured to capture video data and audio data of one or more locations at which the media recording device is placed; and a computing system communicatively coupled to the media recording device, the computing system configured to:

receive, without user interaction, the captured video data and the audio data from the media recording device via a wireless network;

receive a first request from a mobile device for a media collection service;

in response to the first request, determine, without user interaction, a user of the mobile device to be within a proximity of the plurality of distributed video devices;

in accordance with a determination that the user is within the proximity of the plurality of distributed video devices:

identify, without user interaction, video data and audio data in which associated with the user of the mobile device appears; and store the identified video data and the audio data together with a user account associated with a user of the mobile device;

receive a second request, via the computing system, from the user of the mobile device to access the identified video data and the audio data; and in response to the second request, transmit the identified video data and the audio data to the user.

15. The system of claim 14, comprising a plurality of media recording devices communicatively coupled to the computing system, wherein the plurality of media recording devices are configured to be placed throughout or about an indoor facility, an outdoor vicinity, or a combination thereof.

16. The system of claim 14, wherein the media recording device is configured to continuously provide the video data and the audio data to the computing system.

17. The system of claim 14, wherein the media recording device is configured to capture the video data and the audio data based on a specified time period, a location of the user of the media recording device, or a combination thereof.

18. The system of claim 14, wherein the media recording device is configured to communicatively couple to an external electronic device via a low-power short range wireless communication network.

19. The system of claim 14, wherein the computing system is configured to determine the location of the media recording device by performing a facial recognition analysis of the video data.

20. The system of claim 14, wherein the computing system is configured to receive a log of the user's locations over time, and the identification of the video data and the audio data in which the user of the mobile device appears is based in part on the received log.

* * * * *

UNITED STATES PATENT AND TRADEMARK OFFICE
CERTIFICATE OF CORRECTION

PATENT NO. : 10,462,409 B2  
APPLICATION NO. : 14/513067  
DATED : October 29, 2019  
INVENTOR(S) : Alberth, Jr.

Page 1 of 1

It is certified that error appears in the above-identified patent and that said Letters Patent is hereby corrected as shown below:

In the Claims

Claim 2, Column 7, Line 6, please delete "determining a user" and insert --determining the user--;

Claim 2, Column 7, Line 7, please delete "a mobile" and insert --the mobile--;

Claim 14, Column 8, Line 20, please delete "in which associated with the" and insert --in which the--;

Claim 14, Column 8, Line 23, please delete "with a user" and insert --with the user--.

Signed and Sealed this  
Fourteenth Day of January, 2020

Andrei Iancu  
*Director of the United States Patent and Trademark Office*